(12) United States Patent
Koetz (10) Patent No.: US 9,685,162 B2
(45) Date of Patent: Jun. 20, 2017

(54) ELECTRICALLY OPERATED FOOD PROCESSOR

(71) Applicant: Vorwerk & Co. Interholding GmbH, Wuppertal (DE)

(72) Inventor: Hendrik Koetz, Witten (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 196 days.

(21) Appl. No.: 14/647,476

(22) PCT Filed: Nov. 27, 2013

(86) PCT No.: PCT/EP2013/074797
§ 371 (c)(1),
(2) Date: May 27, 2015

(87) PCT Pub. No.: WO2014/083021
PCT Pub. Date: Jun. 5, 2014

(65) Prior Publication Data
US 2015/0279370 A1 Oct. 1, 2015

(30) Foreign Application Priority Data
Nov. 29, 2012 (DE) .................... 10 2012 111 600

(51) Int. Cl.
*A47J 43/07* (2006.01)
*G10L 17/22* (2013.01)
*G10L 15/00* (2013.01)

(52) U.S. Cl.
CPC ............... *G10L 17/22* (2013.01); *A47J 43/07* (2013.01); *A47J 43/0716* (2013.01); *G10L 15/00* (2013.01)

(58) Field of Classification Search
CPC ..................................................... A47J 43/0716
USPC ..................... 366/142, 205, 206, 314, 601
See application file for complete search history.

(56) References Cited

U.S. PATENT DOCUMENTS

| | | | |
|---|---|---|---|
| 2,815,193 A * | 12/1957 | Brown | B08B 3/12 165/109.1 |
| 3,943,421 A | 3/1976 | Shibata et al. | |
| 5,156,867 A | 10/1992 | Leuthold et al. | |
| 5,267,211 A | 11/1993 | Kobayashi et al. | |
| 5,556,198 A | 9/1996 | Dickson, Jr. et al. | |
| 6,587,739 B1 | 7/2003 | Abrams et al. | |
| 6,728,343 B1 | 4/2004 | Taylor et al. | |

(Continued)

FOREIGN PATENT DOCUMENTS

CN 202051534 U 11/2011
DE 10 2007 059 236 A1 6/2009
(Continued)

OTHER PUBLICATIONS

International Search Report of PCT/EP2013/074797, mailed Mar. 17, 2014.
(Continued)

*Primary Examiner* — David Sorkin
(74) *Attorney, Agent, or Firm* — Collard & Roe, P.C.

(57) ABSTRACT

An electrically operated food processor with a mixing bowl and a mixer in the mixing bowl is provided with an acoustic transducer and with stored speech recognition software, it being possible to use speech recognition to cause the food processor to carry out a routine task. The speech recognition may be activated by turning on the food processor.

7 Claims, 3 Drawing Sheets

(56) References Cited

U.S. PATENT DOCUMENTS

| | | |
|---|---|---|
| 2002/0009016 A1 | 1/2002 | Ancona et al. |
| 2002/0009017 A1 | 1/2002 | Kolar et al. |
| 2002/0167861 A1* | 11/2002 | Barton .................. A47J 43/082 366/142 |
| 2002/0176320 A1 | 11/2002 | Wulf et al. |
| 2004/0203387 A1 | 10/2004 | Grannan |
| 2004/0267382 A1 | 12/2004 | Cunningham et al. |
| 2005/0068846 A1 | 3/2005 | Wulf et al. |
| 2008/0225636 A1 | 9/2008 | Kolar |
| 2010/0061181 A1* | 3/2010 | Malackowski ...... A61B 17/151 366/142 |
| 2010/0270285 A1 | 10/2010 | Qian et al. |
| 2011/0029314 A1 | 2/2011 | Lin et al. |
| 2011/0149677 A1 | 6/2011 | Davis et al. |
| 2011/0187640 A1 | 8/2011 | Jacobsen et al. |
| 2011/0230238 A1 | 9/2011 | Aronsson et al. |
| 2011/0312311 A1 | 12/2011 | Abifaker et al. |
| 2012/0111798 A1 | 5/2012 | Mundheim Ylikangas |
| 2012/0154108 A1 | 6/2012 | Sugaya |
| 2012/0220338 A1 | 8/2012 | DeGrazia et al. |
| 2013/0003490 A1 | 1/2013 | Kemker et al. |
| 2014/0269154 A1 | 9/2014 | Kolar et al. |
| 2015/0117137 A1* | 4/2015 | Haney .................. B01F 7/00291 366/142 |
| 2015/0305564 A1 | 10/2015 | Jimenez et al. |
| 2015/0305566 A1 | 10/2015 | Koetz |
| 2015/0305567 A1 | 10/2015 | Koetz |
| 2016/0241653 A1 | 8/2016 | Ciepiel |
| 2016/0249771 A1 | 9/2016 | Van Der Gaag et al. |

FOREIGN PATENT DOCUMENTS

| | | |
|---|---|---|
| DE | 10 2010 060 650 A1 | 5/2011 |
| EP | 1 561 409 A1 | 8/2005 |
| TW | M441164 U1 | 11/2012 |
| WO | 2011/106350 A2 | 9/2011 |

OTHER PUBLICATIONS

International Search Report of PCT/EP2013/074807, mailed Mar. 25, 2014.

International Search Report of PCT/EP2013/074798, mailed Mar. 25, 2014.

* cited by examiner

ELECTRICALLY OPERATED FOOD PROCESSOR

CROSS REFERENCE TO RELATED APPLICATIONS

This application is the National Stage of PCT/EP2013/074797 filed on Nov. 27, 2013, which claims priority under 35 U.S.C. §119 of German Application No. 10 2012 111 600.8 filed on Nov. 29, 2012, the disclosure of which is incorporated by reference. The international application under PCT article 21(2) was not published in English.

The invention relates to an electrically operated food processor with a mixing bowl and a mixer in the mixing bowl.

Food processors of the type in question are known, for example from DE 102007059236 A1. The processing of food is possible by means of such food processors, the cooking of dishes is furthermore possible in the case of heatable mixing bowls. The heating power, which acts on the mixing bowl or on the content of the mixing bowl, respectively, can preferably be controlled by the user, and preferably also the direction of rotation and the rotary speed of the mixer in the mixing bowl, furthermore also the duration of the impact of heater and/or mixer, if applicable.

It is furthermore known to set in particular the above-mentioned parameters of the food processor at the food processor by means of electrical or electronic, respectively, or mechanical setting means, for example by means of rotary switches or push buttons. It is also known in this context to assign a preferably non-volatile memory, which offers a recipe selection, to the food processor. Such a recipe selection can preferably be displayed and selected on a display of the food processor. With regard thereto, reference is made to DE 102009055794 A1 or also to DE 102010060650 A1. If the user selects a recipe stored in the food processor, preferably the parameters, which are to be set, such as temperature, mixer speed and duration of the program, if applicable, are provided and, if applicable, are set independently after confirmation by the user; they can furthermore be changed by the user, if applicable.

A food processor, which can receive control commands via a speech recognition, is known from US 2005/0068846 A1.

Based on the last-mentioned state of the art, the invention deals with the task of embodying a food processor of the mentioned type with regard to a safe handling and operation in an advantageous manner.

This task is solved in the case of the subject matter of claim 1, which focuses on provision being made for an optical system, which checks, whether a person is located directly in front of the food processor and also faces it.

A possibility for simultaneous optical recognition and speech recognition is at hand. A food processor, which encompasses critical functions with regard to the operating possibilities, which are to not be triggered by chance unintentionally, can also be controlled through this.

In a further embodiment, it is preferred for the food processor to furthermore encompass a speech output, in particular for acoustically operating a received acoustic signal (in particular word or word sequence) of the user, to which the highest probability is attributed. More preferably, provision is made for this purpose in or at the food processor, respectively, for a loudspeaker. In this context, provision can be made that the term or command, which is recognized by the speech recognition software and which is reproduced acoustically, needs to be confirmed or can be declined by the user by means of a further, final signal. This can preferably be a yes/no confirmation.

In a more preferred embodiment, the analyzed acoustic signal, which has been converted into a command, can be checked for plausibility. An implausible command preferably leads to an optical or acoustic inquiry. If, for example, a temperature of 90° C. is chosen in a dough kneed speed setting, a further inquiry is made, which can require a special confirmation, if applicable. Provision can also be made for the control to reject the determined command as not being executable.

It is also preferred for the speech recognition to be activated when the food processor is turned on. By activating the food processor, for example as a result of operating a main switch or plugging a power plug into the power socket of the power supply of the house, the food processor can already be in a so-called stand-by mode, in which the speech recognition is activated at the same time.

It is furthermore preferred for the speech recognition to be capable of being activated only by turning off the food processor, for example as a result of the operation of the main switch into an off position or by unplugging the power supply on the mains side.

Provision can be made for the speech recognition to only gather or release instructions for carrying out a routine task, if a certain acoustic signal, for example a signal word, has been recognized. Preferably, this is a code word, which has been deposited, that is, stored in a data bank of the food processor, only in response to which the speech recognition is activated with regard to work commands or recipe access. It is thus avoided that the food processor can be operated by chance in this way.

In a more preferred embodiment, the speech recognition software can also be deactivated again by means of an acoustic code or a signal word, respectively. However, a preprogrammed time period, in which no further acoustic signal has been received, can also be sufficient for this.

Provision can also be made for the food processor as such to be capable of being turned off by means of an acoustic code. The speech recognition software as well as the further components provided for the corresponding recognition, such as the microphone, for example, can encompass their own power supply for this purpose. Provision can be made for a battery or accumulator power supply. The further electrical and electronic components of the food processor are activated by detecting and registering the correct signal word. The voltage supply of these components can be switched through this.

It is also preferred that the command words need to be received at a predetermined distance to the microphone and/or at a predetermined minimum volume, so as to evaluate them. It is ensured through this that the user, who operates the food processor by means of acoustic signals, such as voice commands in particular, is in direct proximity of the food processor, thus preferably at a distance of between 0.5 and 2 m, more preferably approximately 1 m.

The recognition accuracy of the acoustic signals, thus in particular the speech recognition, can be increased further. The recognition, which is based on microphones, is preferably supplemented by an optical recognition, preferably by means of a camera. Due to the fact that background and ambient noise, such as telephone, radio or motor noise, appears frequently in the vicinity of a food processor, signals can be interfered with, for example by background noise. An acoustic conversion of a voice command into a machine command can thus be supplemented by means of an optical system, comparable to lip-reading. A camera installed in the food processor can detect a corresponding person and can analyze movements of the person's lips or mouth, respectively, so as to draw a conclusion to the spoken word in this manner. The optical information obtained in this manner can be compared with the acoustic information, so as to increase the recognition rate of the voice commands in this manner or so as to increase the robustness as compared to misinterpretation, respectively.

Provision can be made for the food processor to react only to voice commands, if the food processor is addressed directly, thus if it is clearly the receiver of the acoustic signal.

Many other noise sources, such as a radio or a television set, also exist in a vicinity of the food processor in a household. It cannot be ruled out that the food processor receives acoustic signal through this, which the food processor interprets as instructions, which are directed to the food processor. To ensure that a food processor converts a voice command into a machine command only if this was intended by the user, if possible, provision can be made for an optical system, in particular in the form of an electronic camera comprising an evaluation electronics. It can be checked through this, whether a person is located directly in front of the food processor and also faces it. A food processor is to respond to voice commands only in this case. If no person is detected, all voice commands are preferably ignored.

The acoustic transducer can also provide a recording of sound, thus also spoken commands or instructions, for example in the form of digital data.

The food processor is suitable to also be used by persons, who are visually handicapped. The signal control makes it possible to be able to select in particular the variables speed, duration and temperature, if applicable, or cooking functions, respectively, for example complex cooking processes or the selection of a recipe by means of an acoustic signal, in particular speech. It is not required hereby, but is nonetheless possible in a preferred embodiment, to also touch the food processor hereby, at least in the operational state, and having to select corresponding push buttons or switches.

The acoustic signal is preferably a sound signal from the user, more preferably the spoken word from the user, for instance in the form of a voice command. A voice command can be typified, it can thus comprise for example one or a plurality of key words provided for a function or selection.

Complete recipes can preferably also be selected via the signal recognition from a preferably internal recipe data bank of the food processor by means of speech, provided that a suitable recipe, that is, a recipe which can be assigned to the voice command, for example, or a partial area of a recipe is stored in the recipe data bank. Such a recipe or a partial area thereof comprises in particular a sequential sequence of one or a plurality of the three above-identified variables or complex cooking functions, respectively. The sequence includes the selection of the variable and the setting of the variable. A complex cooking function can be characterized by a control mechanism. An independent adaptation of a function, for instance the heating power here, can take place in response to a measuring of a parameter, such as the temperature.

The sequence in particular of the cooking process can hereby possibly be relatively extensive, so that work is facilitated for the user by means of a one-time verbal accessing of the recipe or of a partial area thereof. The recipe is accessed directly, preferably without the user having to move through the menu structure of the recipe data bank—also verbally.

On principle, the operation of switches or push buttons, as it is known from the state of the art, is not intuitive, but instead requires studying operating instructions for the most part and certain practice with the food processor. In particular speech, however, turns out to be intuitive for the user and does not require any familiarization. Only getting used to certain vocabulary might be necessary for controlling the food processor with one's own voice.

The spoken word or another acoustic signal of the user or the acoustic pressure resulting therefrom, respectively, is converted into electrical signals by means of an acoustic transducer in the form of an electronic microphone, which is preferably arranged in the housing of the food processor, more preferably in the area of the housing, which faces the user when performing typical work With the food processor. These signals are preferably processed and analyzed by a digital signal processor (DSP). After the continuous analysis of the received acoustic signals and the comparison with a previously defined signal list, which is more preferably present in a stored data bank, the digital signal processor returns the evaluation, which has the highest probability. It is examined, to which stored signals the received acoustic signal corresponds most.

In a further detail, a microcontroller preferably analyzes the word, which is present in text form, for example, or the acoustic signal in a further step and translates it into a machine command or directly into a recipe, behind which a sequence of machine commands is stored. Finally, the machine command or commands are transferred to the control of the food processor and are executed by it.

In a more preferable embodiment, a heating and/or a running of the mixer is only carried out, if speed, temperature and duration are provided or are accepted in response to a corresponding proposal by the food processor. This means that in one case, the user must specify values for all three parameters, thus in particular for the speed, the temperature and the duration. The order can be provided hereby or can be queried successively, respectively, by a speech output of the food processor.

In the alternative, in particular in response to using a stored recipe, which was preferably accessed by means of a voice command, an acoustic output of the parameters, such as speed, temperature and duration, which were set independently according to the recipe, can be confirmed by the user via the food processor, for example via speech input.

If the speech recognition is turned off, which can preferably also be turned off deliberately here in each case by the user, a common manual operation of the food processor can be carried out. Preferably, a common manual operation is also possible in addition to an operation via speech recognition. At the user's option, the user can provide instructions to the food processor by means of an acoustic signal and speech recognition or the user can carry out a certain manual operation. It can also be possible that it is preset or that it can be selected that the food processor can only be operated via speech recognition.

The software evaluation described above and below does not need to be made in the food processor. It can also be carried out, for example by means of radio contact to a computer located outside of the food processor or hand-held unit, such as a mobile telephone, for instance. It can also be carried out in a spatially remote computer ("cloud").

The invention will be explained below by means of the enclosed drawing, which, however, represents only an exemplary embodiment.

Figure 1:
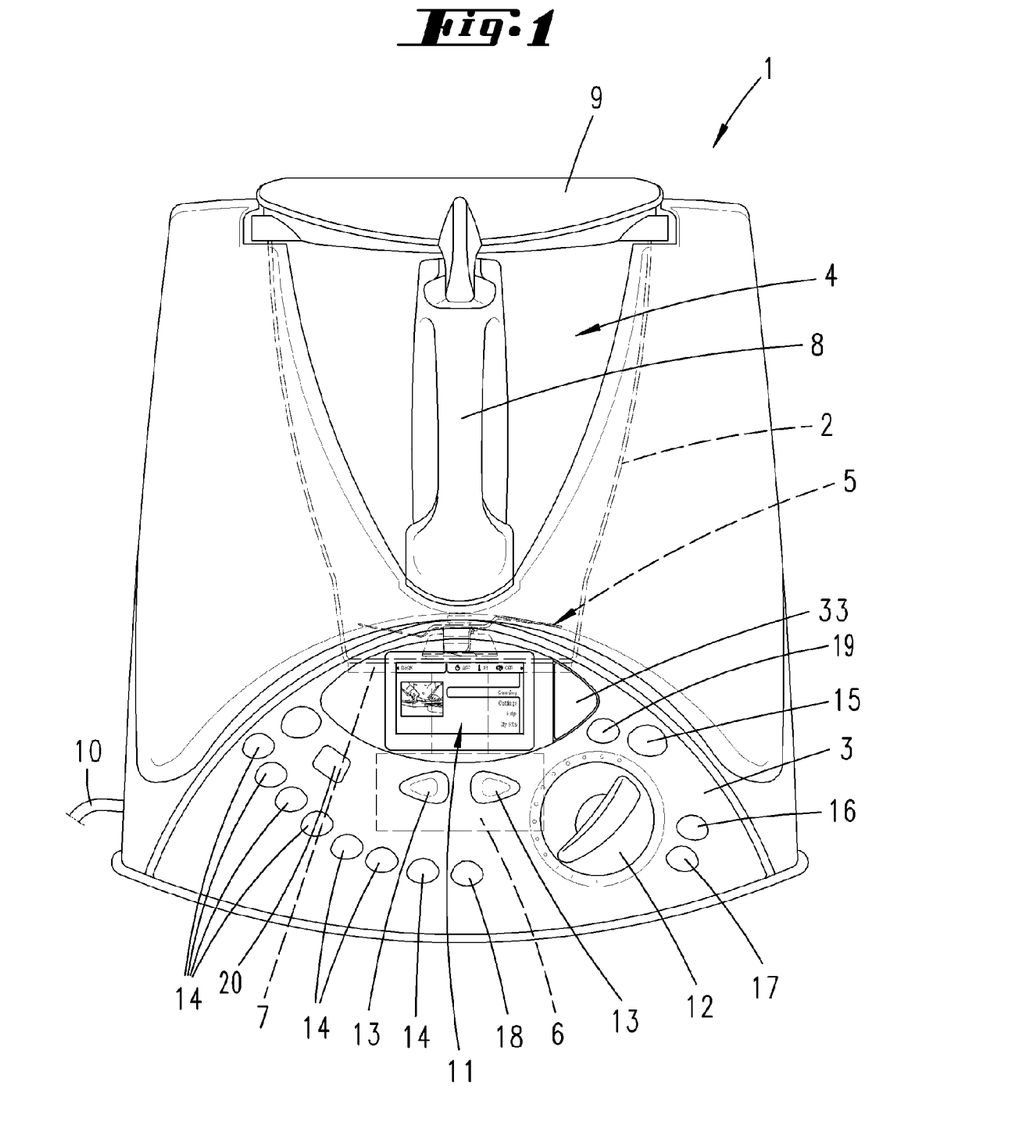
FIG. 1 shows a view of a food processor of the type in question with a mixing bowl accommodated in a mixing bowl accommodation, mechanical switches for setting variables as well as a display.

A food processor 1 with a mixing bowl accommodation 2 and a control panel 3 is illustrated and described initially with regard to FIG. 1.

A mixing bowl 4 can be assigned to the food processor 1, in that said mixing bowl is inserted into the mixing bowl accommodation 2, in particular in the base area of the mixing bowl 4, preferably with positive locking. Assigned to the mixing bowl bottom, provision is made in the mixing bowl 4 for a mixer 5, which is operated via an electric motor 6, which is arranged in the food processor 1 below the mixing bowl accommodation 2 and which is only illustrated schematically in the drawing. The mixer 5 remains in the mixing bowl 4 even if the latter is removed from the mixing bowl accommodation 2, for the purpose of which, in a more preferable manner, the mixer 5 is connected to the electric motor 6 via a torque proof plug-in coupling in the assigned position.

The bottom of the mixing bowl 4 can preferably be heated to heat a food to be cooked, which is located in the mixing bowl 4. Preferably, an electrical resistance heating 7, which is integrated in the bottom of the mixing bowl 4, is used here.

The mixing bowl 4 is preferably embodied in a pot-like manner comprising a substantially circular cross section, with a cross section, which widens conically to the pot opening, that is, towards the top. The pot wall preferably consists of a metal material.

The mixing bowl 4 furthermore encompasses a grab handle 8, which is preferably oriented vertically and which is fixed to the mixing bowl 4, for example on the base side as well as on the side of the pot edge.

The mixing bowl 4 is preferably assigned to the food processor 1 such that the grab handle 8 extends in a free-standing manner between device housing brackets, facing the control panel 3, wherein the base area of the mixing bowl 4 is supported on an integral bottom of the food processor 1 in the area of the accommodation 2, by coupling mixer drive and mixer 5 and preferably by electrically contacting the heater on the side of the mixing bowl bottom.

A bowl lid 9 can be attached to the mixing bowl 4. During operation of the food processor 1, further in particular during operation of the mixer 5 and/or of the resistance heating 7 on the bottom side, said bowl lid is locked in an attached position, more preferably to the housing of the food processor 1. Centrally, the bowl lid 9 has a non-illustrated filler opening.

The electric supply of the electric motor 6 as well as of the heater 7, which is more preferably provided on the bottom side of the mixing bowl, and furthermore also of the electrical control of the entire food processor 1 is attained via a power cord 10.

Initially, provision is preferably made in the control panel 3 for a display 11. More preferably, the control panel 3 supports one or a plurality of mechanical switches and controllers for setting different variables for the operation of the food processor 1. Initially, provision is thus preferably made for a rotary switch 12 for setting the speed of the mixer 5, whereby mixer speed stages are preferably selected via the rotary switch 12, and a provided mixer speed is assigned to each mixer speed stage.

Provision is made in the illustrated exemplary embodiment for two further mechanical switches in the form of pushbuttons 13, preferably below the display 11. With this, a duration can be input as variable, via which duration preferably the mixer 5 and/or the heater 7 of the mixing bowl 4 on the bottom side is activated.

In addition, provision can be made for a number of mechanical switches in the form of push buttons 14, via which different, provided temperatures can be selected. Preferably, these are temperatures in the range of from 37° C. to 100° C. By means of the chosen temperature and the mixer speed, which is chosen via the rotary switch 12, if applicable, heat is applied to the food to be cooked, which is located in the mixing bowl 4, for a period, which is provided by means of the push buttons 13.

In addition, provision can furthermore be made in the control panel 3 for further push buttons for accessing stored special functions, thus in particular a push button 15 for activating a turbo function, in response to which the mixer 5 is operated at a maximum speed for a short time, that is, preferably for a period of between 1 and 3 seconds, more preferably for a period, which corresponds to the period during which the push button is acted upon. More preferably, the turbo function thus leads to a temporary speed of the mixer 5 of more than 10.000 rpm, more preferably more than 12.000 rpm, up to 15.000 rpm, for example.

A further push button 16 preferably serves to activate a direction reversal function for the mixer 5. If, during normal operation, the mixer 5 preferably rotates clockwise, the push button 16 provides for the switchover to counter-clockwise. The new direction of rotation can be maintained until the period specified via the pushbuttons 13 has expired. More preferably, the electronics of the food processor 1 (then) switches back into the standard direction of rotation independently. It is also possible to reverse the direction of rotation again by operating the push button 16 during the mixer operation again.

Provision is preferably furthermore made for a push button 17 for activating a dough mixing function, which is used in particular when making heavy yeast and bread doughs.

The variables, which are to be set via the rotary switch 12 as well as via the push buttons 13 to 17 or the functions, which are to be accessed, respectively, can preferably be displayed in the display 11.

Figure 2:
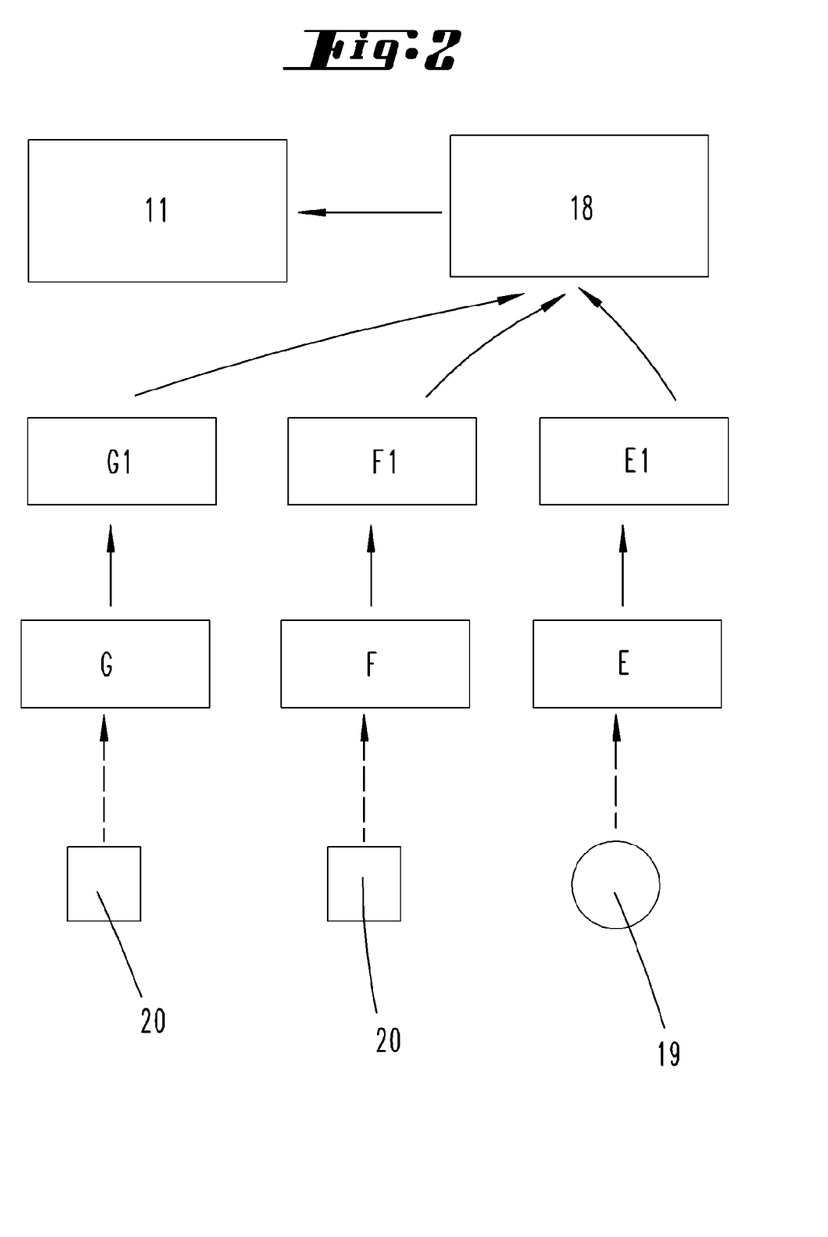
FIG. 2 shows a schematic illustration of the recognition software and data banks stored in the food processor 1 to control the latter.

A recipe data bank 18 is more preferably stored in the food processor 1. This recipe data bank includes a plurality of recipes for preparation in the food processor 1, preferably in a categorized manner. Preferably the parameters or variables, respectively, relating to the speed of the mixer 5, temperature of the resistance heating 7 and duration are assigned to each recipe. Preferably, the food processor 1 sets these variables independently or provides them to the user for confirmation with the activation of the recipe process.

In addition, users or user groups, for example, can be assigned to each recipe, so that every user of the food processor 1 can access his preferred recipes at the touch of a button, so to speak, without moving through the menu in a time-consuming manner. The latter is preferably displayed on the display 11 in the conventional manner. In one embodiment, said display 11 can be embodied as touchscreen.

In addition and parallel to an operation via an acoustic signal, the food processor 1 can preferably also be operated manually in the conventional manner, thus in particular as a result of operating rotary switch 12 and push buttons 13 to 17.

Preferably, the food processor 1 is activated initially for operation, more preferably solely by one or a plurality of authorized persons.

The authorization proof for activating the food processor and for activing the operating functions of the food processor is preferably attained by means of a speech control and/or a gesture control and/or a face recognition.

For this purpose, the food processor 1 more preferably encompasses a speech recognition software E and/or a face recognition software F and/or a gesture recognition software G. An acoustic transducer 19 in the form of a microphone is furthermore arranged in particular in the area of the control panel 3 in interaction with the speech recognition software E. The microphone as well as an electronic camera 20, which is provided more preferably, is potentially directed towards the user of the food processor 1 in the control panel 3. The camera serves to capture images, which can be evaluated, in combination with the face recognition software F and/or the gesture recognition software G.

In response to the speech recognition, preferably the spoken word, in particular the command word or the acoustic pressure resulting therefrom, respectively, is converted into electrical signals and is processed and analyzed by a digital signal processor. After the continuous analysis of the received words and the comparison with a previously defined word list within a control data bank $E_1$, the signal processor returns the word having the highest probability, which corresponds to the spoken word. In a further step, a microcontroller analyzes the word, which is present in text form, and translates it into a machine command or into a recipe or converts it, respectively, such that a recipe is accessed specifically from the recipe data bank 18 and is displayed at least on the display 11. In a preferred further development, the transmission of the machine command to the recipe data bank 18 has the result that the parameters, such as speed, temperature and time, which belong to the accessed recipe or recipe section, are preset automatically.

As an alternative to or also in combination with the speech recognition, an image is captured continuously by using the camera 20, which is provided in the control panel 3, in particular for face recognition, furthermore as an alternative thereto or in combination therewith for gesture recognition.

If a user is located in a defined image section and at a defined distance in front of the food processor 1, the image is examined, the face is extracted in the event of a face recognition, and is compared with a previously generated face data bank $F_1$. The comparison with the face data bank $F_1$ is attained by means of a processor, which is integrated in the food processor, wherein the face data bank $F_1$ as well as the further data banks are preferably stored in a non-volatile memory.

If a face, which has been stored in the face data bank $F_1$ as reference value, is recognized via the face recognition F, this recognition can lead to the translation into a machine command or into a recipe for selection from the recipe data bank 18, as in the case of speech recognition.

If a gesture of the user is recognized via the camera 20, for example an up and down movement of a hand, wiping with the hand, etc., this can preferably lead to the same operating commands as described above with regard to the face recognition or speech recognition.

If a user is located in a defined image section and at a distance, the captured image is examined and the body of the user or body parts, respectively, such as face or hands, is extracted. If the body of the recognized person is in a stable position, the gesture recognition G it initiated. The movement of a hand, for example, is hereby observed and analyzed continuously. For recognition, the movement of a hand is determined by calculating movement vectors. The differential image calculation, in which an extracted feature (for example the hand) is determined initially in consecutive images, and the position of which is searched in the analyzed images, is suitable for this. If a movement corresponds to a previously defined gesture from the gesture data bank $G_1$, the function of the food processor 1, which is stored for this, is executed, for example the setting of one or a plurality of parameters, such as speed, temperature or time, in addition the selection of a certain recipe from the recipe data bank 18.

In a preferred embodiment, the respective recognition for controlling the food processor 1 preferably in a contact-free manner—which is preferably possible in addition to the common manual control of the food processor 1—initially requires the food processor 1 to be turned on, in particular the activation thereof, for example via a main switch. In the alternative, the activation of the food processor can be attained by means of a certain voice command and/or gesture command and/or by recognizing a certain face, if applicable. The food processor can thus preferably only be activated as a whole by recognizing a provided signal word or a provided gesture, whereby signal word or gesture preferably differ greatly from common words of gestures.

The activation of the food processor 1 can be limited to certain persons by means of a face recognition.

Figure 3:
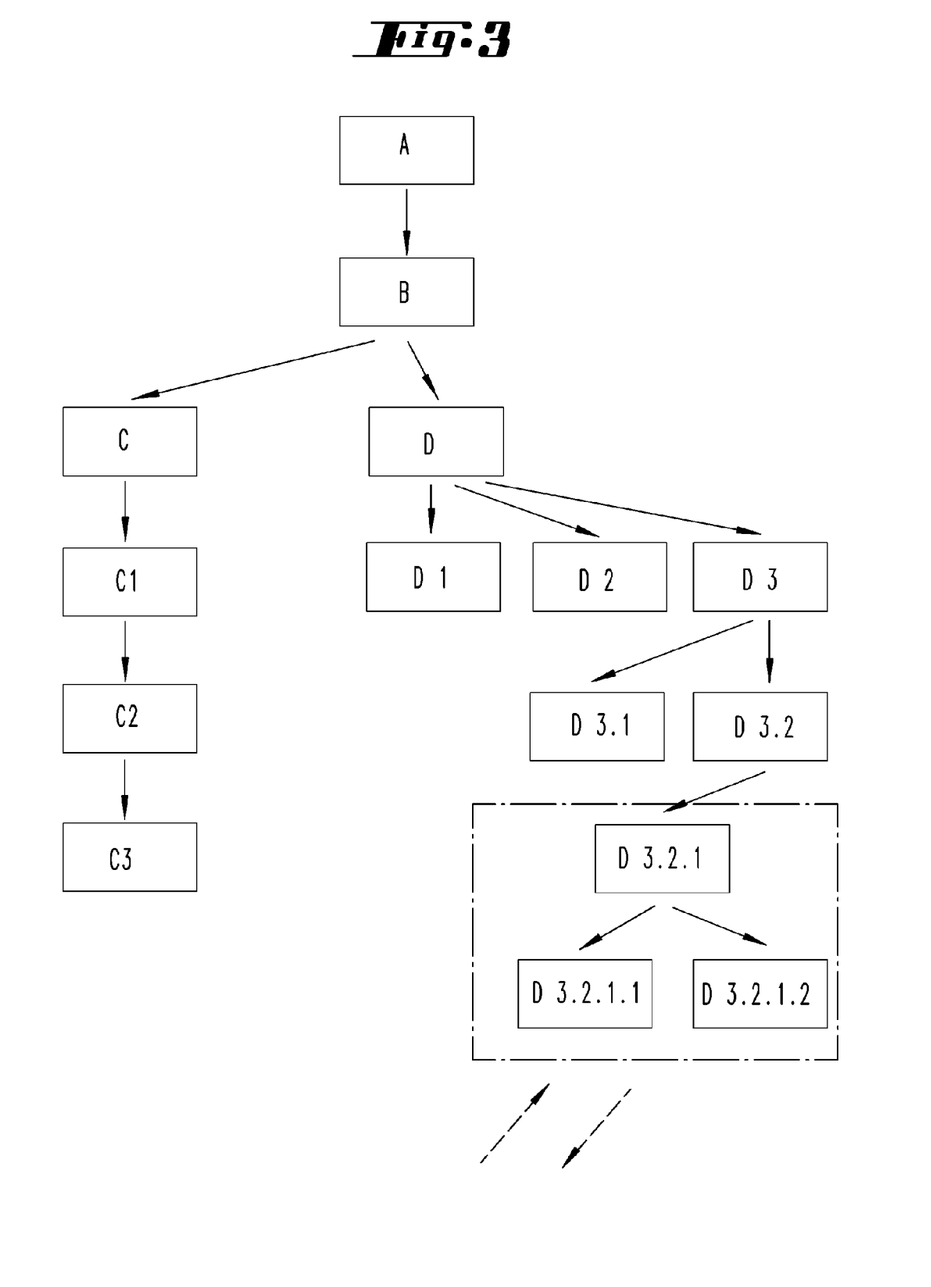
FIG. 3 shows a flowchart for illustrating an exemplary operation of the food processor.

Based on this activation in point A in FIG. 3, the food processor 1 can be operated optionally under point B, it can thus be operated manually in the conventional manner on the one hand, on the other hand in a contact-free manner as a result of gesture and/or face and/or speech recognition.

Due to a certain command word and/or a certain gesture and/or due to a facial image in the face data bank, which is associated with corresponding parameters, the parameters can be set manually (point C) after activation, thus in particular the speed $C_1$, the temperature $C_2$ and the duration $C_3$, and/or the recipe data bank can be accessed under point D. Depending on the command word, face or gesture, all functions are activated or are available only to a limited extent.

As can furthermore be seen from the flowchart in FIG. 3, the recipes D are divided in a wide variety of submenus, for instance initially under the generic terms "sauces" D1, "meat" D2 and "baked goods" D3 in the illustrated exemplary embodiment, wherein the latter term, in turn, is divided into "cakes" D3.1 and "bread" D3.2.

The menu item "bread" offers a submenu "rolls" D3.2.1, among others, which, in turn, is divided into "wheat rolls" D3.2.1.1 and "rye rolls" D3.2.1.2, for example.

The recipe data bank can be maneuvered, for example via the speech recognition E, thus in particular as a result of command words, which correspond to the individual menu items (for example "recipes", "baked goods", "bread", etc.).

In the alternative, a submenu can also be accessed directly via the speech recognition E, for example by means of the word "rolls", in response to which the submenu is then displayed directly in the display 11.

As a further alternative, the possible submenu items are specified acoustically as a result of a speech output, in response to which the user can react with the corresponding command word. If the command word corresponds directly to a submenu, which is not subdivided further, for example "rye rolls" in the illustrated exemplary embodiment, the corresponding recipe is accessed directly and the parameters for speed, temperature and time are set, if applicable.

The gesture recognition and the routine task of the food processor 1 resulting therefrom is equivalent to the above-described speech recognition. Different gestures, in particular with the hand, lead to routine tasks of the food processor 1, which correspond to the respective gesture, thus for example, to accessing a certain recipe or to setting possible special functions of the food processor, such as the cake batter setting, for example.

When a certain face is recognized, a selection of recipes culminating in one recipe can be provided as a function of the parameters, which belong to the reference face stored in the data bank.

Regardless of whether a gesture recognition, a face recognition or a speech recognition can be used or is used or also a combination thereof, it is more preferable for the registered command, which is to be converted, to initially be queried optically, for example, in the display 11 or acoustically by means of speech output. In the case of a speech recognition, the user can react to this with yes or no, for example.

In a preferred embodiment, the setting of speed $C_1$ and/or temperature $C_2$ by means of a gesture and/or a word command is only converted into a corresponding action, if the duration $C_3$ has furthermore also been set. This can take place manually. In addition, a query can also be made so as to ask the user to also input the duration.

In the case of a gesture recognition, speed, temperature and/or time can be set, for example by continuously moving the hand upwards or moving it downwards.

The above descriptions serve to explain the inventions, which are covered as a whole by the application, which further develop the state of the art at least by means of the following feature combinations, in each case independently, namely:

A food processor, which is characterized in that the food processor 1 encompasses an acoustic transducer 19 and that a speech recognition software is stored and that speech recognition E can be used to cause the food processor 1 to carry out a routine task.

A food processor, which is characterized in that the speech recognition E is activated by turning on the food processor 1.

A food processor, which is characterized in that the speech recognition E can only be deactivated by turning off the food processor 1.

A food processor, which is characterized in that the speech recognition E only starts or releases execution of a routine task if a signal word has been detected.

A food processor, which is characterized in that a heating of the mixing bowl and/or a running of the mixer 5 can be carried out only when the speed $C_1$, the temperature $C_2$ and the duration $C_3$ are provided or are accepted in response to a corresponding suggestion from the food processor 1.

A food processor, which is characterized in that an optical recognition is carried out.

A food processor, which is characterized in that the optical recognition is carried out in terms of a lip-reading.

A food processor, which is characterized in that the optical recognition can be compared with the speech recognition E to increase the recognition rate.

REFERENCE LIST 1 food processor
2 mixing bowl accommodation
3 operating panel
4 mixing bowl
5 mixer
6 electric motor
7 resistance heating
8 grab handle
9 bowl lid
10 power cord
11 display
12 rotary switch
13 push button
14 push button
15 push button
16 push button
17 push button
18 recipe data bank
19 acoustic transducer
20 camera
A activation
B selection
C parameter setting
$C_1$ speed
$C_2$ temperature
$C_3$ duration
D recipes
D1 sauces
D2 meat
D3 baked goods
D3.1 cake
D3.2 bread
D3.2.1 rolls
D3.2.1.1 wheat rolls
D3.2.1.2 rye rolls
E speech recognition
$E_1$ command data bank
F face recognition
$F_1$ face data bank
G gesture recognition
$G_1$ gesture data bank

The invention claimed is:

1. An electrically operated food processor (1) comprising:
   (a) a mixing bowl (4);
   (b) a mixer (5) in the mixing bowl (4);
   (c) an acoustic transducer (19);
   (d) a microcontroller comprising a speech recognition software; and
   (e) an optical system which checks whether a person is located directly in front of and faces the food processor;
   wherein speech recognition (E) causes the food processor (1) to carry out a routine task; and
   wherein the food processor follows a speech instruction only when the speech instruction is given by the person and the person is located directly in front of and faces the food processor.

2. The food processor according to claim 1, wherein the speech recognition (E) is activated by turning on the food processor (1).

3. The food processor according to claim 1, wherein the speech recognition (E) can only be deactivated by turning off the food processor (1).

4. The food processor according claim 1, wherein the speech recognition (E) only starts or releases execution of a routine task if a signal word has been detected.

5. The food processor according to claim 1, wherein a heating of the mixing bowl and/or a running of the mixer (5) can be carried out only when the speed (C1), the temperature (C2) and the duration (C3) are provided or are accepted in response to a corresponding suggestion from the food processor (1).

6. The food processor according to claim 1, wherein the optical system is embodied to carry out a recognition in terms of a lip-reading.

7. The food processor according to claim 1, wherein, as a result of the optical recognition, the optical recognition is embodied to be compared with the speech recognition to increase the recognition rate.

* * * * *